(12) United States Patent
Detry et al.

(10) Patent No.: US 7,817,344 B2
(45) Date of Patent: Oct. 19, 2010

(54) SYSTEMS AND METHODS FOR MICROMACHINED CYLINDRICAL LENSES

(75) Inventors: James F. Detry, Plymouth, MN (US); Robert J. Carlson, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 182 days.

(21) Appl. No.: 12/200,040

(22) Filed: Aug. 28, 2008

(65) Prior Publication Data

US 2010/0053769 A1    Mar. 4, 2010

(51) Int. Cl.
*G02B 13/08*    (2006.01)
(52) U.S. Cl. .................................... 359/668; 359/670
(58) Field of Classification Search ............... 359/668, 359/670, 671, 710, 796
See application file for complete search history.

(56) References Cited

U.S. PATENT DOCUMENTS

| | | | |
|---|---|---|---|
| 5,095,386 A | 3/1992 | Scheibengraber | |
| 5,499,262 A | 3/1996 | Nakata | |
| 5,636,059 A * | 6/1997 | Snyder | ..................... 359/668 |
| 5,844,723 A | 12/1998 | Snyder | |
| 5,973,853 A * | 10/1999 | Gaebe et al. | ................ 359/668 |
| 6,094,293 A | 7/2000 | Yokoyama et al. | |
| 6,160,672 A | 12/2000 | Chan et al. | |
| 6,246,451 B1 * | 6/2001 | Matsumura et al. | ........... 349/15 |
| 7,479,627 B2 * | 1/2009 | Yoshimoto et al. | .......... 250/239 |
| 7,661,842 B2 * | 2/2010 | Chou | ......................... 362/237 |
| 7,675,231 B2 * | 3/2010 | Fung et al. | .................. 313/506 |

FOREIGN PATENT DOCUMENTS

JP    2002169116    6/2002

OTHER PUBLICATIONS

Ruey Fang Shyu, Hsiharng Yang, Wen-Ren Tsai and Jhy-Cherng Tsai, Micro-Ball Lens Array Fabrication in Photoresist Using PTFE Hydrophobic Effect, pp. 1-6, DTIP of MEMS & MOEMS, Stresa, Italy, Apr. 26-28, 2006, ISBN: 2-916187-03-0.
Wallace Latimer, Designing with Micro-Optics, pp. 1-6, WDM Solutions, www.lw.pennnet.com, Jan. 2001.
European Patent Office, "European Search Report", Oct. 1, 2009, Published in: EP.

* cited by examiner

*Primary Examiner*—Timothy J Thompson
(74) *Attorney, Agent, or Firm*—Fogg & Powers LLC

(57) ABSTRACT

Systems and methods are operable to focus light. An exemplary embodiment has a MEMS substrate, a first cylindrical lens having a first cylindrical surface, and a second cylindrical lens having a second cylindrical surface that is oriented perpendicular to the first cylindrical surface. Light passing through the first and second cylindrical lenses is focused.

15 Claims, 6 Drawing Sheets

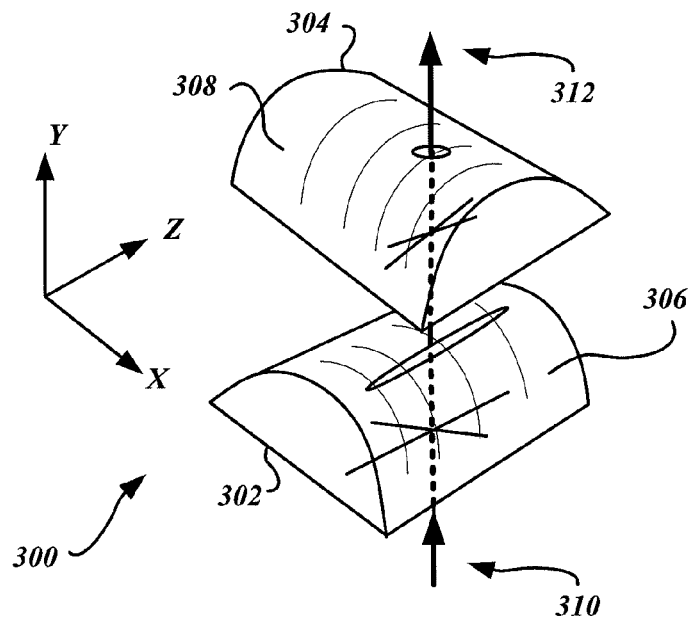
FIG. 3
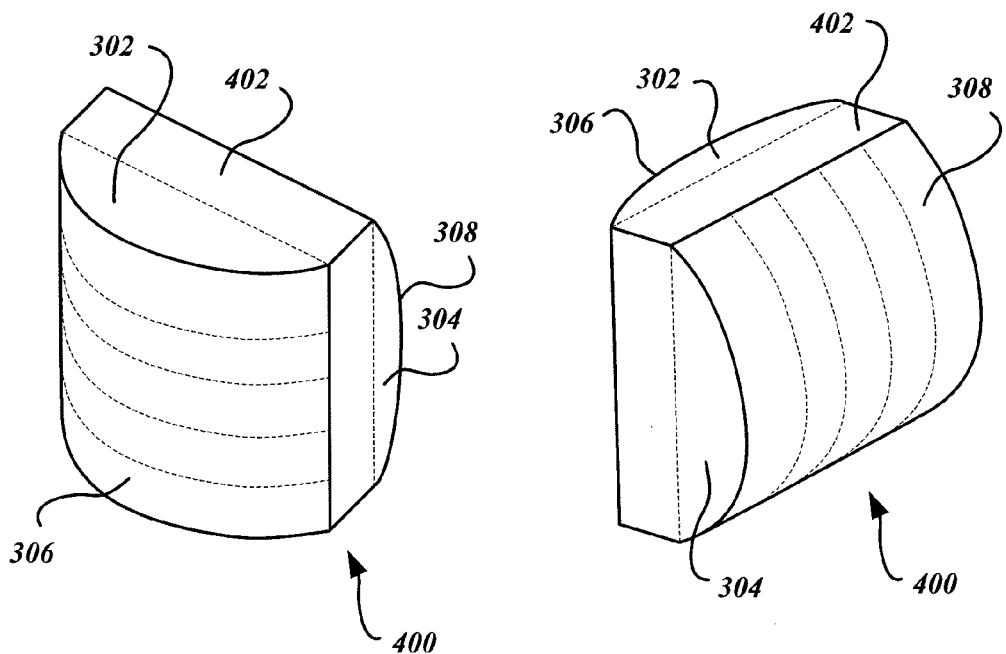
FIG. 4A  FIG. 4B

SYSTEMS AND METHODS FOR MICROMACHINED CYLINDRICAL LENSES

BACKGROUND OF THE INVENTION

Optical systems transmit light through various media, such as air or light transmissive materials. Such optical systems employ one or more lenses to focus and condition the transmitted light. One exemplary lens is a ball lens, also known as a Luneberg lens. Some optical systems are relatively small. Ball lenses may be used in various Micro-Electro-Mechanical Systems (MEMS) optical technologies. FIG. 1 is a simplified block diagram of a light source 102 and a ball lens 104 deployed in a prior art MEMS optical system 106. Emitted light 108 enters the ball lens 104. The light is then focused by the ball lens 104, and exits as focused light 110.

Typically, ball lens is separately formed from the MEMS optical system, and then picked and placed into position using a manual or automated technique. The location of the ball lens in the MEMS optical system may be controlled by etching or machining a suitable ball lens receptacle, such as depression or the like, into a supporting substrate. Thus, the ball lens is placed in a desired location when the ball lens is placed into its receptacle.

In some applications, gravity may aid in the placement of the ball lens into its respective receptacle. That is, gravity helps position the ball lens so that it lies at the lowest contact points of its receptacle, such as the four side walls of an inverted pyramid receptacle. In other systems, a force may be applied to the ball lens to place it into its intended position in the substrate. If desirable, the positioned ball lens may be attached to the substrate with an adhesive or by use of another suitable fastening means.

Precise control of the placement of a relatively small ball lens may be difficult. And, in some situations, the ball lens may inadvertently move out of its intended location on the substrate. Further, as MEMS optical systems become increasingly smaller, it may be desirable to use light focusing lenses that are smaller than a conventional ball lens.

SUMMARY OF THE INVENTION

Systems and methods of focusing light are disclosed. An exemplary embodiment has a MEMS substrate, a first cylindrical lens having a first cylindrical surface, and a second cylindrical lens having a second cylindrical surface that is oriented perpendicular to the first cylindrical surface. Light passing through the first and second cylindrical lenses is focused.

BRIEF DESCRIPTION OF THE DRAWINGS

Preferred and alternative embodiments are described in detail below with reference to the following drawings:

FIG. 3 is a perspective view of two cylindrical lens of an embodiment of the cylindrical lens system;

FIGS. 4A and 4B are perspective views a cylindrical lens system where the two cylindrical lens are fabricated on a single structure;

DETAILED DESCRIPTION OF THE PREFERRED EMBODIMENT

Figure 1:
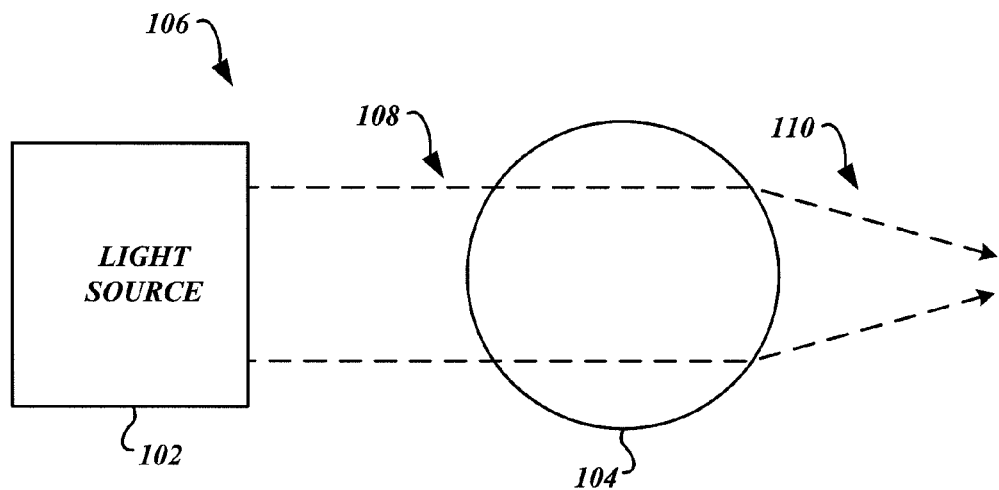
FIG. 1 is a simplified block diagram of a light source and a ball lens of a prior art MEMS optical system.
Figure 2:
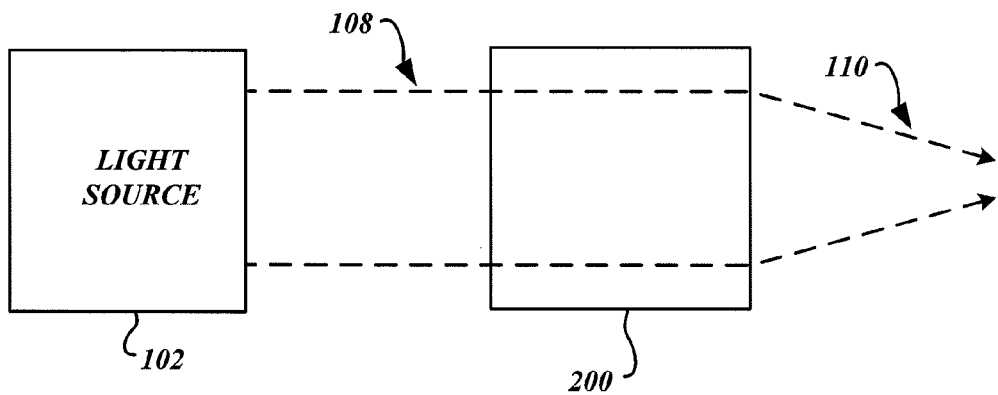
FIG. 2 is a block diagram of a cylindrical lens embodiment which focuses received light.

FIG. 2 is a block diagram of a cylindrical lens system 200 which focuses received light. The light is focused in a manner that substantially corresponds to light focusing of the prior art ball lens 102 (FIG. 1).

Emitted light 108 enters the cylindrical lens system 200. The light is then focused by the cylindrical lens system 200, and exits as the focused light 110. The cylindrical lens system 200 is conceptually illustrated as a functional block in FIG. 2. Exemplary embodiments of the cylindrical lens system 200 are described in greater detail herein, and are illustrated in the figures using a reference numeral corresponding to "x00", wherein the "x" corresponds to the figure number. For example, the cylindrical lens system 300 illustrated in FIG. 3 corresponds to the cylindrical lens system 200 illustrated in FIG. 2.

FIG. 3 is a perspective view of two cylindrical lens 302, 304 of an embodiment of the cylindrical lens system 300. The first cylindrical lens 302 is oriented along the illustrated "z" axis. The second cylindrical lens 304 is oriented along the illustrated "x" axis. Accordingly, the first cylindrical lens 302 is oriented ninety degrees (90°) from, or perpendicular to, the second cylindrical lens 304.

The first cylindrical lens 302 has a cylindrical surface 306 corresponding to a portion of a cylinder. Similarly, the second cylindrical lens 304 has a cylindrical surface 308 corresponding to a portion of a cylinder. Preferably, the radius of curvature defining the cylindrical surfaces 306, 308 is the same, or substantially the same. However, in various embodiments, the radius of curvature of the cylindrical surfaces 306, 308 may be different depending upon the desired light focusing effect to be performed by the cylindrical lens system 300 embodiment. In some embodiments, the cylindrical surfaces 306 and/or 308 may correspond to other geometries.

Light 310 enters the bottom side of the first cylindrical lens 302 (at the illustrated "x") and exits the cylindrical surface 306 (at the illustrated "o"). The light is focused substantially as a slit along the axis of the first cylindrical lens 302.

Then, the light enters the bottom side of the second cylindrical lens 304 (at the illustrated "x") and exits the cylindrical surface 308 (at the illustrated "o"). The received slit of focused light is then focused substantially as a spot by the second cylindrical lens 304. Because the orientation of the cylindrical surface 306 of the first cylindrical lens 302 is perpendicular to the orientation of the cylindrical surface 308 of the second cylindrical lens 304, the light is focused in a manner that is substantially similar to light focused by a prior art ball lens 104 (FIG. 1).

FIG. 4A is a left side perspective view of a cylindrical lens system 400 embodiment where the two cylindrical lens 302, 304 are fabricated on a single structure. FIG. 4B is a right side perspective view of the cylindrical lens system 400 embodiment. Here, the first cylindrical lens 302 is on a side of a lens portion 402 and the second cylindrical lens 304 is on an opposing side of the lens portion 402. The orientation of the cylindrical surface 306 of the first cylindrical lens 302 is perpendicular to the orientation of the cylindrical surface 308 of the second cylindrical lens 304. In the exemplary embodiment of the cylindrical lens system 400, the cylindrical surface 306 of the first cylindrical lens 302 is facing in an outward direction that is opposite from the outward facing direction of the cylindrical surface 308 of the second cylindrical lens 304.

The dimensions of the lens portion 402, such as the thickness, may be selected based on the particular application wherein the cylindrical lens system 400 embodiment is used. The thickness of the lens portion 402 may be relatively small compared to the thickness of the cylindrical lens 302, 304. In some embodiments, the lens portion 402 may even be eliminated.

During fabrication, the cylindrical lens system 400 embodiment may be fabricated as a separate lens that may be picked up and placed on a substrate at a desired location and in a desired orientation. Alternatively, the lens portion 402 may remain attached to a substrate during the lens fabrication process. Thus, the cylindrical lens system 400 may be fabricated into the substrate at a desired location and orientation.

Figure 5:
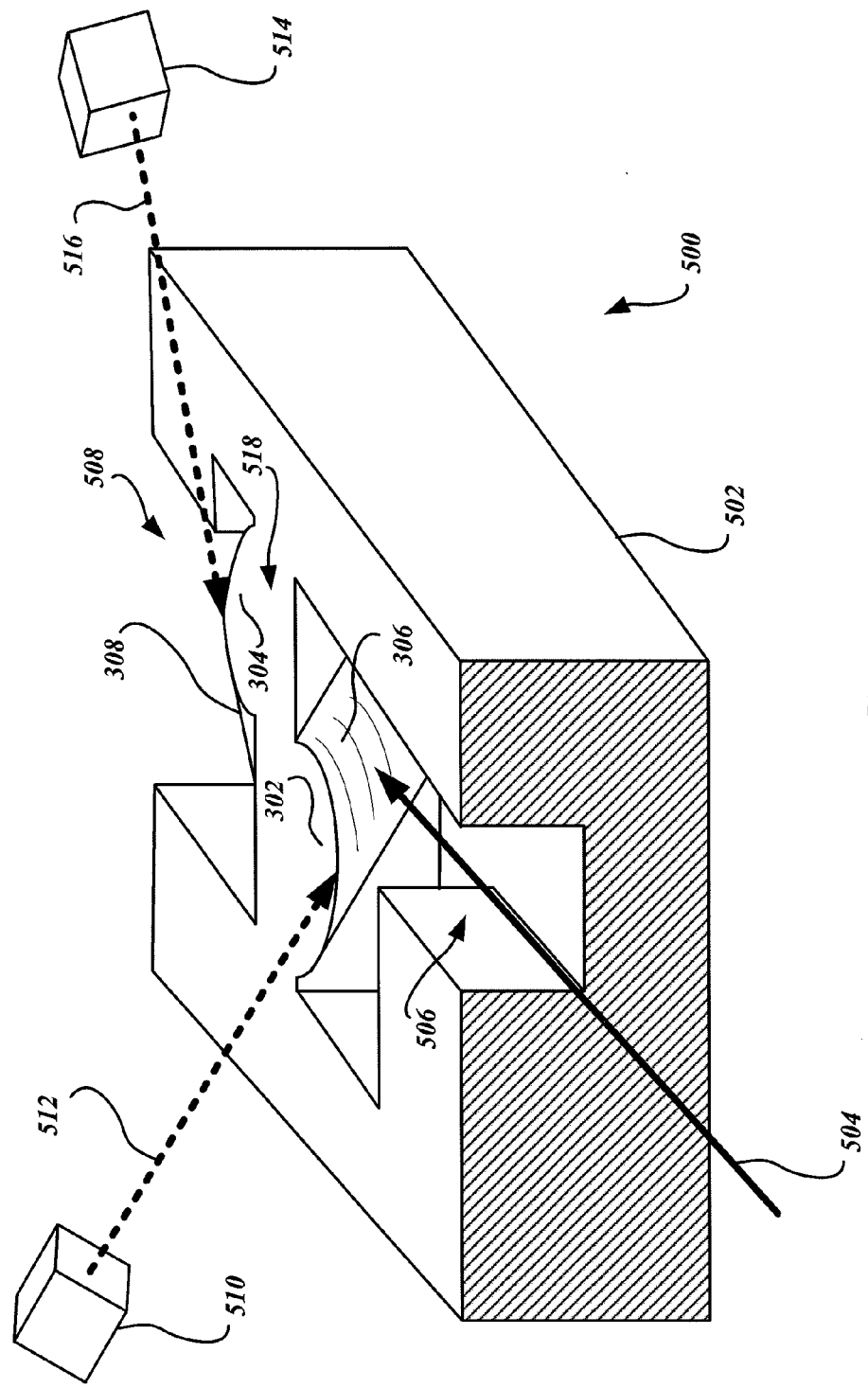
FIG. 5 is a perspective view of two cylindrical lens system with the cylindrical lens fabricated in a portion of a substrate.

FIG. 5 is a perspective view of two cylindrical lens 302, 304 of an embodiment of the cylindrical lens system 500 fabricated in a portion of a substrate 502. The cylindrical surface 306 and the cylindrical surface 308 face outward from each other and are orientated perpendicular to each other. Thus, light 504 passing through the channel 506 is focused by the cylindrical lens 302, 304 and exits out the channel 508. Channels 506, 508 may be fabricated using any suitable means, such as by etching or machining.

Fabrication of this embodiment employs a beam source 510 that transmits a cutting beam 512 onto a portion of the substrate 502 to form the first cylindrical lens 302. The cutting beam 512 is oriented along the axis of the first cylindrical lens 302 such that portions of the substrate 502 are cut away to from the cylindrical surface 306. Similarly, a beam source 514 that transmits a cutting beam 516 onto the substrate portion 502 to form the second cylindrical lens 304. The cutting beam 516 is oriented along the axis of the second cylindrical lens 304 such that portions of the substrate 502 are cut away to from the cylindrical surface 308.

In alternative embodiments, a single beam source may be used. The beam source may be moved and oriented in a desired position to fabricate the first cylindrical lens 302, and then may be moved and reoriented to fabricate the second cylindrical lens 304. In another embodiment, the substrate 502 is placed on a moveable chuck or platform such that the substrate 502 is located and oriented with respect to the beam source. Once the substrate 502 is located and oriented in a first desired location, the beam source fabricates the first cylindrical lens 302. Then, the substrate 502 is relocated and reoriented with respect to the beam source in a desired second location, and the beam source fabricates the second cylindrical lens 304.

Any suitable beam source 510, 514 may be used to generate a suitable cutting beam 512, 516. In one embodiment, an ion beam source is used to generate an ion cutting beam. Ion cutting beams may also be used to polish light transmissive surfaces on the substrate 502, such as the cylindrical surfaces 306, 308.

In this exemplary embodiment, a portion 518 of the substrate 502 separates the first cylindrical lens 302 and the second cylindrical lens 304. The thickness of the portion 518 is definable based upon desired optical characteristics and/or desired structural characteristics. For example, the portion 518 may be relatively thick in applications where the cylindrical lens system 500 may be subject to mechanical stresses induced by rotations and/or accelerations.

It is appreciated that the ends of the first cylindrical lens 302 do not need to be precisely formed into a cylindrical shape. The areas of the cylindrical surface 306 that receives and/or transmits the light 504 are the critical surface areas that need to be precisely fabricated to achieve that desired optical characteristics. Thus, an actual cylindrical lens system 500 may be different than the conceptual embodiment of the cylindrical lens system 500 illustrated in FIG. 5.

Figure 6:
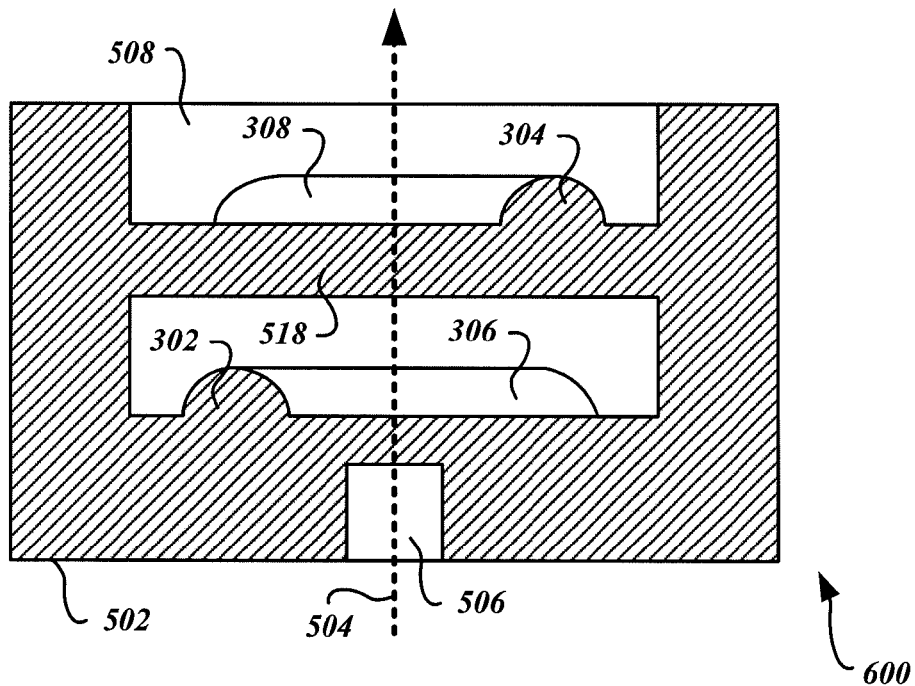
FIGS. 6-8 are top views of two cylindrical lens systems fabricated in a portion of a substrate.
Figure 7:
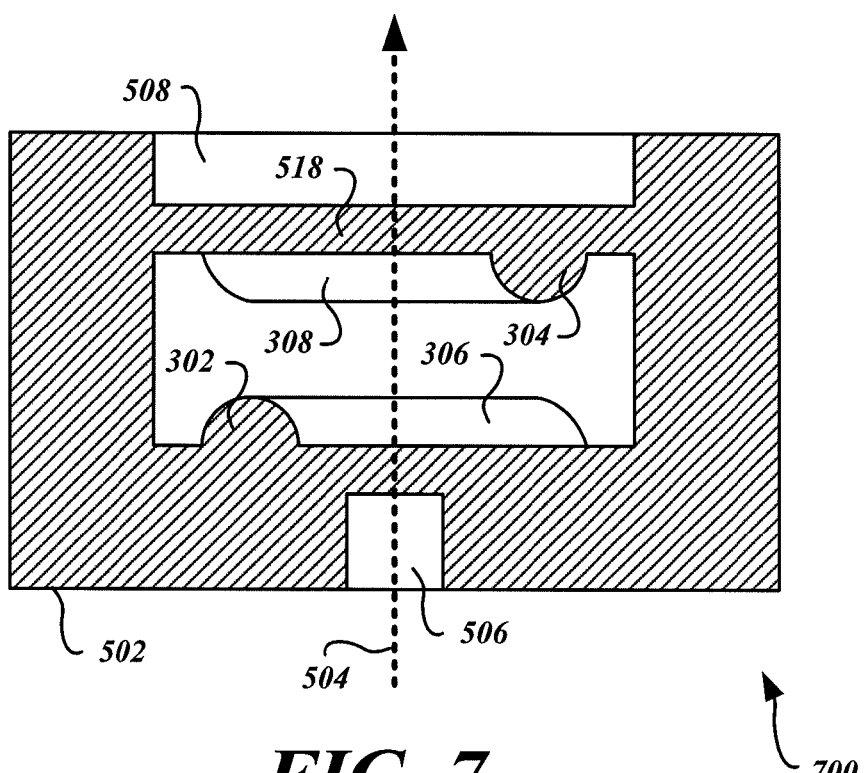
Figure 8:
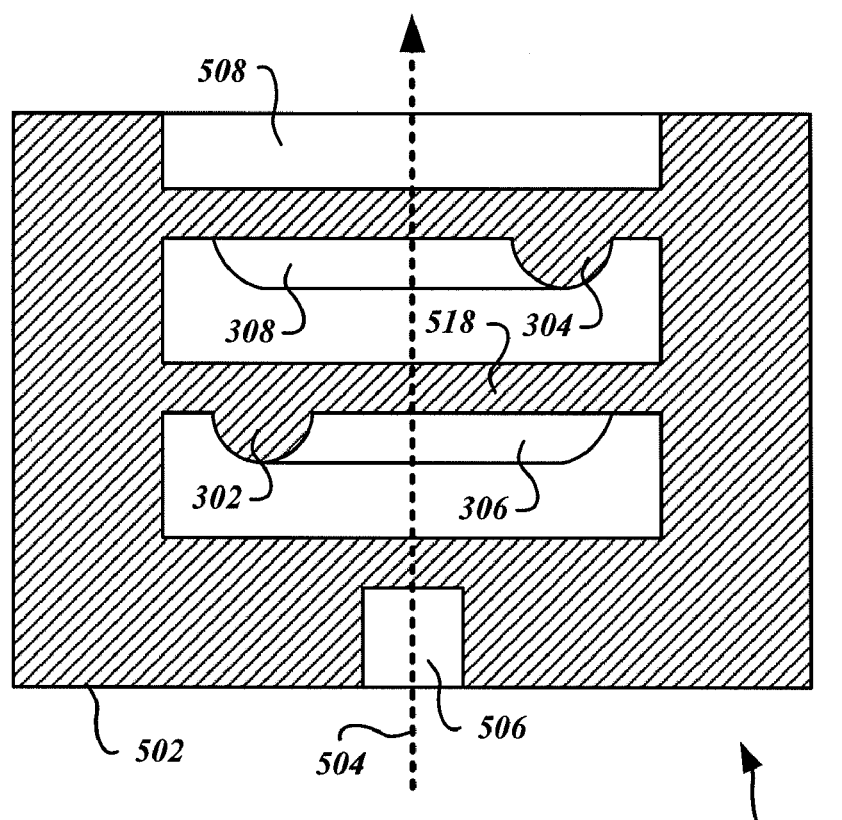

FIGS. 6-8 are top views of two cylindrical lens 302, 304 for selected embodiments of the cylindrical lens systems 600, 700, and 800, respectively, fabricated in a portion of a substrate 502. These exemplary embodiments illustrate some possible ways of locating and orienting the first cylindrical lens 302 and the second cylindrical lens 304 in a substrate 502. Other configurations are possible, but are not illustrated herein or described for brevity. In the various embodiments, the first cylindrical lens 302 is oriented ninety degrees (90°) from, or perpendicular to, the second cylindrical lens 304. The first cylindrical lens 302 and the second cylindrical lens 304 may be facing in the same direction, or may be facing each other, or may be facing away from each other.

The light 504 passing through the channel 506 is focused by the cylindrical lens 302, 304, and exits out the channel 508. Channels 506, 508 may be fabricated using any suitable means, such as by etching or machining. In the various embodiments, the channels 506 and/or 508 may be sized to receive a light transmitting device or structure at a desired location and/or orientation. For example, one or more of the channels 506, 508 may be sized to receive a fiber optic cable. As another example, one or more of the channels 506, 508 may be configured to receive a light source or a light detector.

Figure 9:
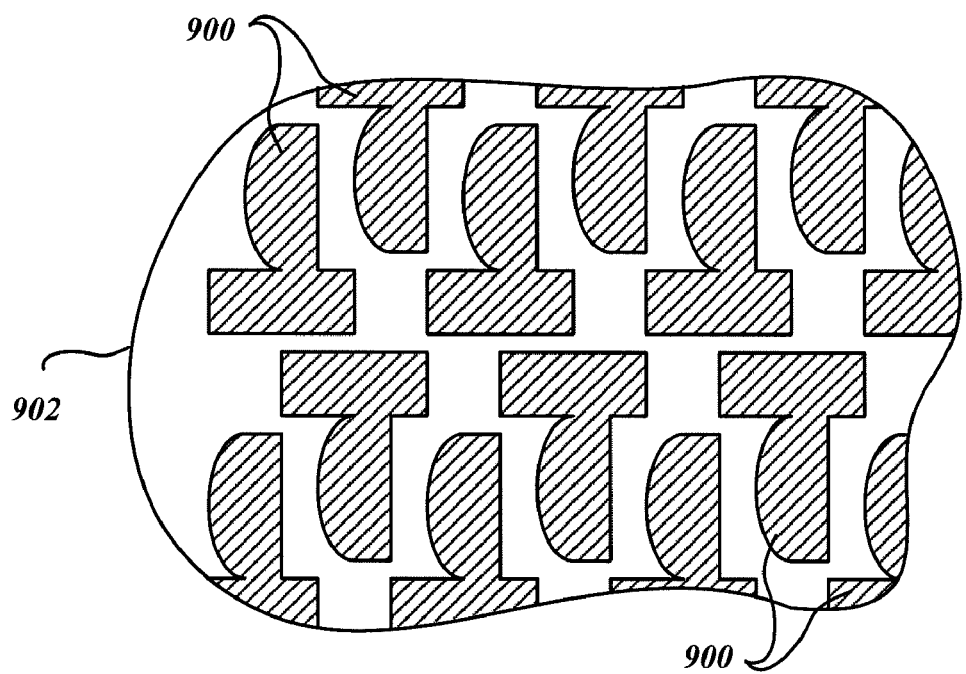
FIGS. 9 and 10 illustrate a released cylindrical lens that is formed using an etching process such that after being released from its substrate or handle, the cylindrical lens may be picked and placed at a desired location and orientation in a substrate.
Figure 10:
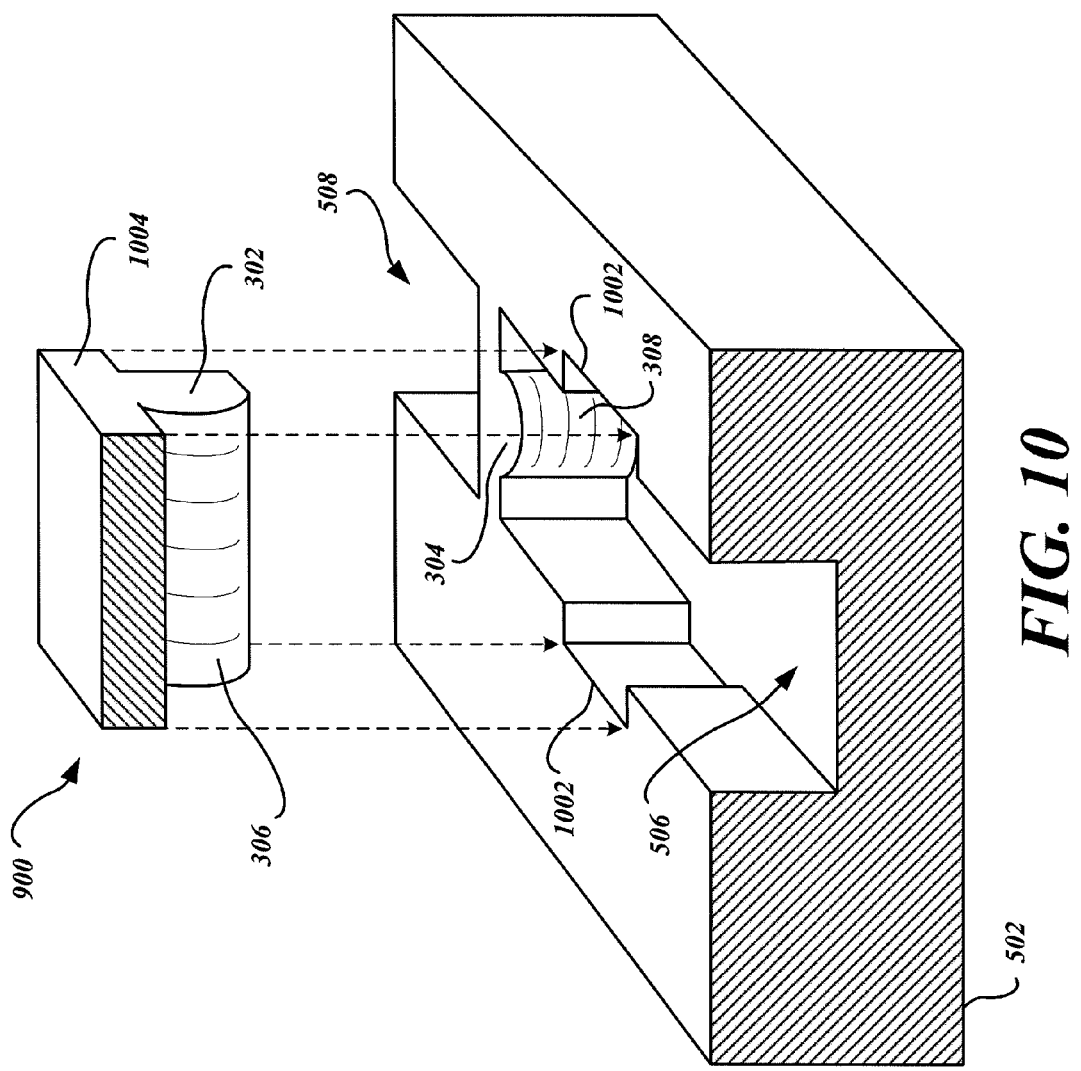

FIGS. 9 and 10 illustrate a released cylindrical lens system 900 embodiment that is fabricated using an etching process to form the first cylindrical lens 302. After the first cylindrical lens 302 is released from its substrate 902, or handle, the released first cylindrical lens 302 may be picked and placed at a desired location and orientation in the substrate 502. FIG. 9 is a top view of the substrate 902 and illustrates that many released first cylindrical lens 302 may be formed during a single etching process.

FIG. 10 is a perspective view of one of the released first cylindrical lens 302 positioned above a plurality of guides 1002. The first cylindrical lens 302 includes the cylindrical surface 306 and an optional guide portion 1004. The guide portion 1004 corresponds to the guides 1002. Thus, when the released first cylindrical lens 302 is picked and placed into its designed location on the substrate 502, the guide portion 1004 slidably engages the corresponding guides 1002 to guide the released first cylindrical lens 302 into its intended position and orientation. It is appreciated that any suitable shape and/or size for the guide portion 1004, and the corresponding guides 1002 may be used.

It is noted that the second cylindrical lens 304 is vertically oriented on the substrate 502. Accordingly, the released first cylindrical lens 302 is oriented ninety degrees (90°) from, or perpendicular to, the second cylindrical lens 304.

Further, the height of the released first cylindrical lens 302 may facilitate placement of the first cylindrical lens 302 at a desired height from the floor of the channel 506. In some embodiments, a floor stop or the like may be added on the lower end of the released first cylindrical lens 302 to further facilitate placement of the released first cylindrical lens 302 at a desired height from the floor of the channel 506.

It is appreciated that with the embodiment illustrated in FIGS. 9 and 10, the second cylindrical lens 304 and its associated cylindrical surface 308 may be formed in the substrate 502 using any suitable etching process. Thus, the released first cylindrical lens 302 and its corresponding second cylindrical lens 304 may be formed using two etching processes.

(Accordingly, the above-described beam source 510 (FIG. 5) is not needed to form the released first cylindrical lens 302 or its corresponding second cylindrical lens 304. However, the beam source 510 may be used for other purposes, such as polishing the cylindrical surfaces 306, 308.)

In other embodiments, with respect to FIGS. 9 and 10, the second cylindrical lens 304 (formed by an etching process of the substrate 502) may be located in front of the released first cylindrical lens 302 such that the second cylindrical lens 304 initially receives the transmitted light. Also, the released first cylindrical lens 302 and the second cylindrical lens 304 are illustrated as facing in the same direction. Alternatively, the released first cylindrical lens 302 and the second cylindrical lens 304 may be facing each other, or may be facing away from each other.

In the various embodiments described herein, it is appreciated that the cylindrical lenses may focus light transmitted in an opposing direction. For example, but not limited to, the light 504 is illustrated in FIG. 5 as entering the channel 506 and exiting the channel 508. The light 504 could have alternatively been transmitted into channel 508 so as to exit from channel 506. Further, a second beam of light (not shown) could be transmitted into channel 508 so as to exit from channel 506 while the light 504 is being transmitted through the cylindrical lens system 500 as illustrated.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An optical device, comprising:
   a substrate;
   a first cylindrical lens on a surface of the substrate having a first cylindrical surface; and
   a second cylindrical lens on the surface of the substrate having a second cylindrical surface that is oriented perpendicular to the first cylindrical surface, wherein at least one of the first cylindrical lens and the second cylindrical lens is fabricated within a portion of the substrate.

2. The optical device of claim 1, wherein the first cylindrical surface and the second cylindrical surface cooperatively focus light passing through the first cylindrical lens and the second cylindrical lens.

3. The optical device of claim 1, wherein the first cylindrical surface and the second cylindrical surface face each other.

4. The optical device of claim 1, wherein the first cylindrical surface and the second cylindrical surface face away from each other.

5. The optical device of claim 1, wherein the first cylindrical surface and the second cylindrical surface face in the same direction.

6. The optical device of claim 5, wherein the first and second cylindrical lenses are on a single structure on the surface of a silicon substrate.

7. The optical device of claim 6, wherein the single structure with the first and second cylindrical lenses is released from the silicon substrate.

8. The optical device of 1, further comprising:
   a guide portion at an end of the first cylindrical lens formed on a first substrate, wherein the guide portion is configured to slidably engage with at least one corresponding guide in a second substrate to guide the first cylindrical lens onto the second substrate on which a second cylindrical lens is formed.

9. The optical device of claim 1, wherein the first and second cylindrical lenses form a MEMS optical device.

10. A method for focusing light on a Micro-Electro-Mechanical Systems (MEMS) optical device using a first cylindrical lens formed on a surface of a substrate having a first cylindrical surface, and a second cylindrical lens formed on the surface of the substrate having a second cylindrical surface that is oriented perpendicular to the first cylindrical surface, the method comprising:
    receiving light at the first cylindrical surface of the first cylindrical lens formed on the surface of the substrate;
    passing light through the first cylindrical lens and the second cylindrical lens formed on the surface of the substrate and transmitting light from the second cylindrical surface,
    wherein the transmitted light is focused by the first cylindrical surface and the second cylindrical surface.

11. The method of claim 10, wherein the first cylindrical surface and the second cylindrical surface cooperatively focus light passing through the first cylindrical lens and the second cylindrical lens.

12. The method of claim 10, wherein the first cylindrical surface and the second cylindrical surface face each other.

13. The method of claim 10, wherein the first cylindrical surface and the second cylindrical surface face away from each other.

14. The method of claim 10, wherein the first cylindrical surface and the second cylindrical surface face in opposite directions from each other.

15. The method of claim 10, wherein the first and second cylindrical lenses are on a single structure on the substrate.

* * * * *